(No Model.)
F. O. DESCHAMPS.
SHAFT COUPLER.
No. 270,287. Patented Jan. 9, 1883.
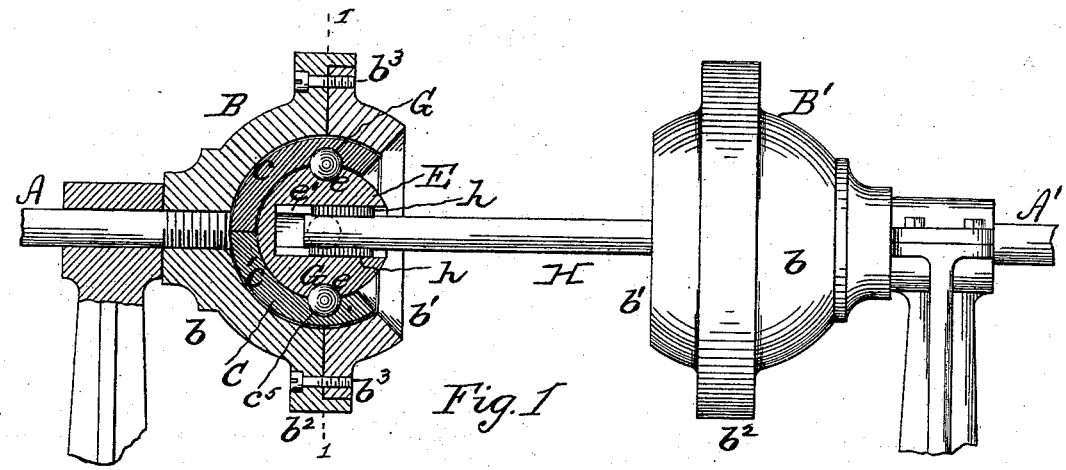
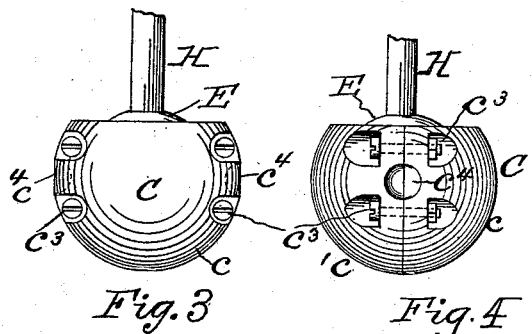
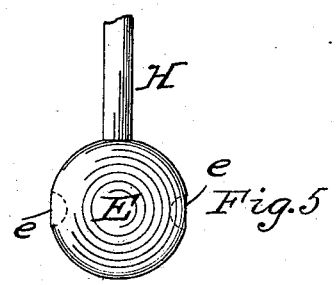
WITNESSES:
Frank Long
Geo. Wentworth
INVENTOR,
F. O. Deschamps
By S. J. Van Stavoren
ATTORNEY.

UNITED STATES PATENT OFFICE.

FRANCIS O. DESCHAMPS, OF PHILADELPHIA, PENNSYLVANIA.

SHAFT-COUPLER.

SPECIFICATION forming part of Letters Patent No. 270,287, dated January 9, 1883.

Application filed November 25, 1882. (No model.)

*To all whom it may concern:*

Be it known that I, FRANCIS O. DESCHAMPS, a citizen of the United States, residing at Philadelphia, in the county of Philadelphia and State of Pennsylvania, have invented certain new and useful Improvements in Shaft-Couplers, of which the following is a specification, reference being had therein to the accompanying drawings, wherein—

Figure 1 is an elevation, partly sectional, of a coupler embodying my invention. Fig. 2 is a section on the line 1 1, Fig. 1. Fig. 3 is a detail elevation of ball and its socket. Fig. 4 is a side view of same, and Fig. 5 is an elevation of the ball.

My invention has relation to ball-and-socket couplers for shafting, and has for its object to provide a coupler which may be manufactured at a low cost, its parts being readily put together without requiring nicety of finish or close fitting, and which is extremely durable.

My invention accordingly consists of a coupler composed of a ball, a socket or shell, and a casing which have articulations or axes at right angles to each other, so as to connect said parts together by a gimbal-joint.

My invention further consists in the novel combination, construction, and arrangement of parts, as hereinafter more particularly described and claimed.

Referring to the accompanying drawings, A A' represent two shafts out of line with each other, and designed to be coupled together in order that power applied to one may be transmitted to the other.

B B' indicate the coupling devices, which are alike in construction, save as hereinafter explained; hence a description of one will answer for both. The coupler B is composed of a spherical casing, made in two parts, $b\ b'$, the former having a recessed flange, $b^2$, for the reception of the latter, which is screwed thereto, as shown at $b^3$, Fig. 1.

C represents a socket or shell, composed of two parts, $c\ c'$, screwed or otherwise fastened together, as illustrated at $c^3$, Figs. 3 and 4.

Upon the inner surface of the casing $b\ b'$ and upon the outer surface of the shell C are formed diametrically-registering semi-spherical recesses $b^4\ c^4$, respectively. In said recesses are placed balls D D, which serve to articulate said casing and shell or form an axis therefor.

Within the shell or socket C is located the ball E; and $c^5\ e$ are semi-spherical recesses formed in said shell and ball, respectively, but at right angles to the recesses $b^4\ c^4$, and in which are placed balls G G, which join the socket and ball together or form an axis therefor, the result whereof is that a ball-and-socket coupler is provided, the parts of which are connected to each other by a gimbal-joint. The advantage of such construction is that the ball and socket of the coupler do not need to be turned or finely finished to make an exact fit one with the other, thereby effecting a material saving of labor. The avoidance of exact fitting for the parts of the coupler makes it more durable, as the entire surfaces of the ball and socket do not work in contact with each other when in operation, but only upon their axes or the balls D and G; hence said parts are preserved from undue wear.

Where two shafts are coupled together, as shown in Fig. 1, an intermediate rod, H, is employed for connecting the balls of the couplers B B'. Said rod is rigidly secured to the ball of coupler B' at one end. Its opposite end is formed with wings or feathers $h\ h$, which telescope in correspondingly-shaped slots $e'\ e'$ in the ball of the coupler B. The provision of the telescoping rod H permits the shafts and couplers to be more readily connected together, as fully explained in a pending application, and need not therefore be more fully described. If desired, said rod may be rigidly connected to the balls of the couplers at both ends. So, too, in coupling two aligning shafts said rod is dispensed with and one of the shafts is secured to the ball and the other to the casing of the coupler, as fully shown in my former patents.

What I claim is—

1. A shaft-coupler composed of a casing, a shell or socket, and a ball connected or articulated by a gimbal-joint, substantially as shown and described.

2. A shaft-coupler composed of a casing, a shell or socket, and a ball having axes at right angles with each other, substantially as shown and described.

3. The combination of casing $b\ b'$, having recesses $b^4\ b^4$, the shell or socket C, having recesses $c^4\ c^5$, the ball E, with recesses $e\ e$, and the articulations or axes D G, substantially as shown and described.

4. The combination of the couplers B B', provided with gimbal-joints, substantially as set forth, with the telescoping connecting-rod H, as and for the purpose described.

5. The combination of casing $b\ b'$, shell C, articulations or axes D G, and ball E, having axial opening with slots $e'\ e'$, substantially as shown and described.

6. A ball-and-socket coupling the parts of which are connected together by a gimbal-joint, substantially as shown and described.

In testimony whereof I affix my signature in presence of two witnesses.

FRANCIS O. DESCHAMPS.

Witnesses:
S. J. VAN STAVOREN,
CHAS. F. VAN HORN.